(12) United States Patent
Huang et al.

(10) Patent No.: US 11,646,513 B2
(45) Date of Patent: May 9, 2023

(54) ELECTRICAL CONNECTOR FOR HIGH-FREQUENCY SIGNAL TRANSMISSION

(71) Applicant: Dongguan Luxshare Technologies Co., Ltd, Dongguan (CN)

(72) Inventors: Bin Huang, Dongguan (CN); RongZhe Guo, Dongguan (CN); QiongNan Chen, Dongguan (CN); HuanHuan Shen, Dongguan (CN); HongJi Chen, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 19 days.

(21) Appl. No.: 17/396,168

(22) Filed: Aug. 6, 2021

(65) Prior Publication Data

US 2022/0102880 A1 Mar. 31, 2022

(30) Foreign Application Priority Data

Sep. 30, 2020 (CN) .......................... 202011061963.4

(51) Int. Cl.
*H01R 12/53* (2011.01)
*H01R 12/55* (2011.01)
(Continued)

(52) U.S. Cl.
CPC ............. *H01R 12/53* (2013.01); *H01R 12/55* (2013.01); *H01R 12/721* (2013.01);
(Continued)

(58) Field of Classification Search
CPC ...... H01R 12/53; H01R 12/55; H01R 12/721; H01R 13/405; H01R 13/518; G02B 6/3628
(Continued)

(56) References Cited

U.S. PATENT DOCUMENTS 8,292,671 B2 * 10/2012 Chung ................... H01R 27/00
439/946
9,306,300 B2 * 4/2016 Chung ................... H01R 12/51
(Continued)

FOREIGN PATENT DOCUMENTS

CN 201374433 Y 12/2009
CN 204424609 U * 6/2015 ......... H01R 13/6594
(Continued)

*Primary Examiner* — Peter G Leigh
(74) *Attorney, Agent, or Firm* — Birch, Stewart, Kolasch & Birch, LLP

(57) ABSTRACT

The present disclosure provides an electrical connector connected with a chip connector. The electrical connector comprises a first terminal component, an adapting board, and a cable. The first terminal component comprises a plurality of terminals. The adapting board is disposed at one side of the first terminal component. At least one of the plurality of terminals of the first terminal component is connected with the adapting board. One end of the cable is connected with the adapting board. The other end of the cable is connected with the chip connector. Since the plurality of terminals and the cable of the first terminal component are connected with the adapting board, selectable cables in multiple dimensions would be increased, the soldering process can be simplified, the soldering cost can be reduced, and the stability of the connection between the terminal and the cable would also be enhanced.

17 Claims, 14 Drawing Sheets

(51) Int. Cl.
   *H01R 12/72*    (2011.01)
   *H01R 13/405*   (2006.01)
   *G02B 6/36*     (2006.01)
   *H01R 13/518*   (2006.01)

(52) U.S. Cl.
   CPC ......... *H01R 13/405* (2013.01); *G02B 6/3628* (2013.01); *H01R 13/518* (2013.01)

(58) Field of Classification Search
   USPC ....................................................... 439/634
   See application file for complete search history.

(56) References Cited

U.S. PATENT DOCUMENTS

| | | | |
|---|---|---|---|
| 9,385,481 B2 * | 7/2016 | Chung | H01R 24/60 |
| 10,651,606 B2 * | 5/2020 | Little | H01R 13/6593 |
| 2016/0218455 A1 * | 7/2016 | Sayre | H01R 13/6594 |
| 2019/0157810 A1 * | 5/2019 | Little | H01R 12/75 |
| 2019/0312389 A1 * | 10/2019 | Little | H01R 13/6594 |

FOREIGN PATENT DOCUMENTS

| | | |
|---|---|---|
| TW | M348345 U | 1/2009 |
| TW | 201145715 A | 12/2011 |
| TW | M512244 U | 11/2015 |
| TW | M526216 U | 7/2016 |
| TW | 201837307 A | 10/2016 |
| TW | M537332 | 2/2017 |
| TW | I651736 B | 2/2019 |
| TW | 202017265 A | 5/2020 |
| TW | I704733 B | 9/2020 |

\* cited by examiner

ELECTRICAL CONNECTOR FOR HIGH-FREQUENCY SIGNAL TRANSMISSION

CROSS-REFERENCE TO RELATED APPLICATION

This application claims the priority benefit of Chinese Patent Application Serial Number 202011061963.4, filed on Sep. 30, 2020, the full disclosure of which is incorporated herein by reference.

BACKGROUND

Technical Field

The present disclosure relates to the technical field of connector, particularly to an electrical connector.

Related Art

At present, requirements for transmission rate of connectors are significantly increasing according to user needs. A plurality of terminals of conventional connectors are often plugged into the circuit board for external signal transmission. As the influence on the connector increases along with the deterioration of circuit board, transmission rate of the connector cannot be effectively maintained and increased. Thus, alternatively, cables are connected with a plurality of terminals of the connector and are used for external signal transmission to reduce influences from circuit board deterioration and to increase transmission rate of the connector. However, since cables are directly soldered onto the terminals, dimensions of the cable are limited by the size of the terminal, which increases the complexity and also the overall cost of the soldering process. Besides, the connection between the cable and the terminal is unstable.

SUMMARY

The embodiments of the present disclosure provide an electrical connector tended to solve the problem of unstable connection between cable and terminals and the dimensions of the cable tend to be limited as the cable is directly soldered to the terminal of conventional connectors, which increases the complexity of the soldering process and the overall soldering cost.

The present disclosure provides an electrical connector connected with a chip connector. The electrical connector comprises a first terminal component, an adapting board, and a cable. The first terminal component comprises a plurality of terminals. The adapting board is disposed at one side of the first terminal component. At least one of the plurality of terminals of the first terminal component is connected with the adapting board. One end of the cable is connected with the adapting board. The other end of the cable is connected with the chip connector.

In the embodiments of the present disclosure, since the plurality of terminals and the cable of the first terminal component are connected with the adapting board, selectable cables in multiple dimensions would be increased, the soldering process can be simplified, the soldering cost can be reduced, and the stability of the connection between the terminal and the cable would also be enhanced.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
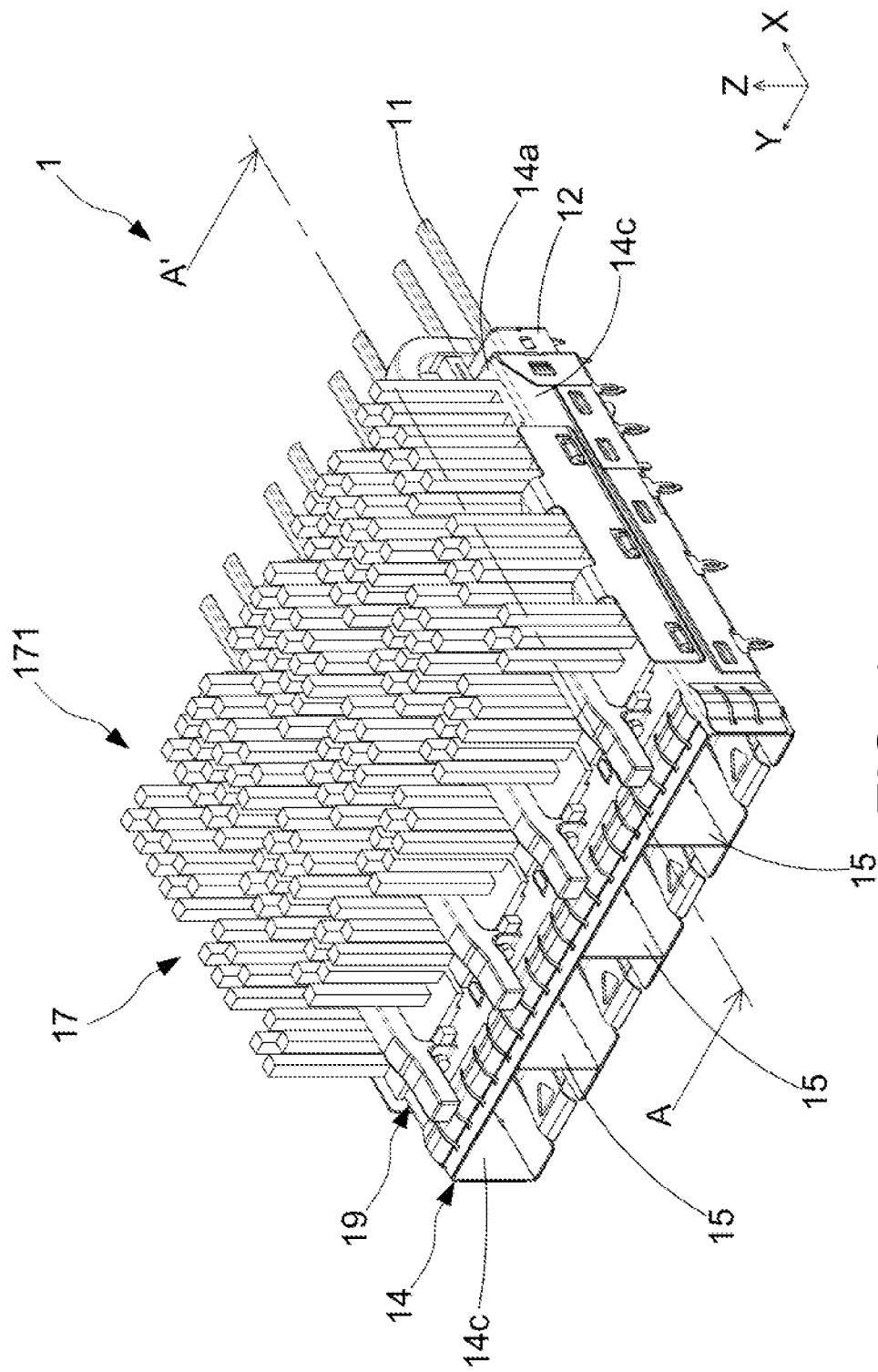
FIG. 1 is a perspective view of an electrical connector of the first embodiment of the present disclosure.
Figure 2:
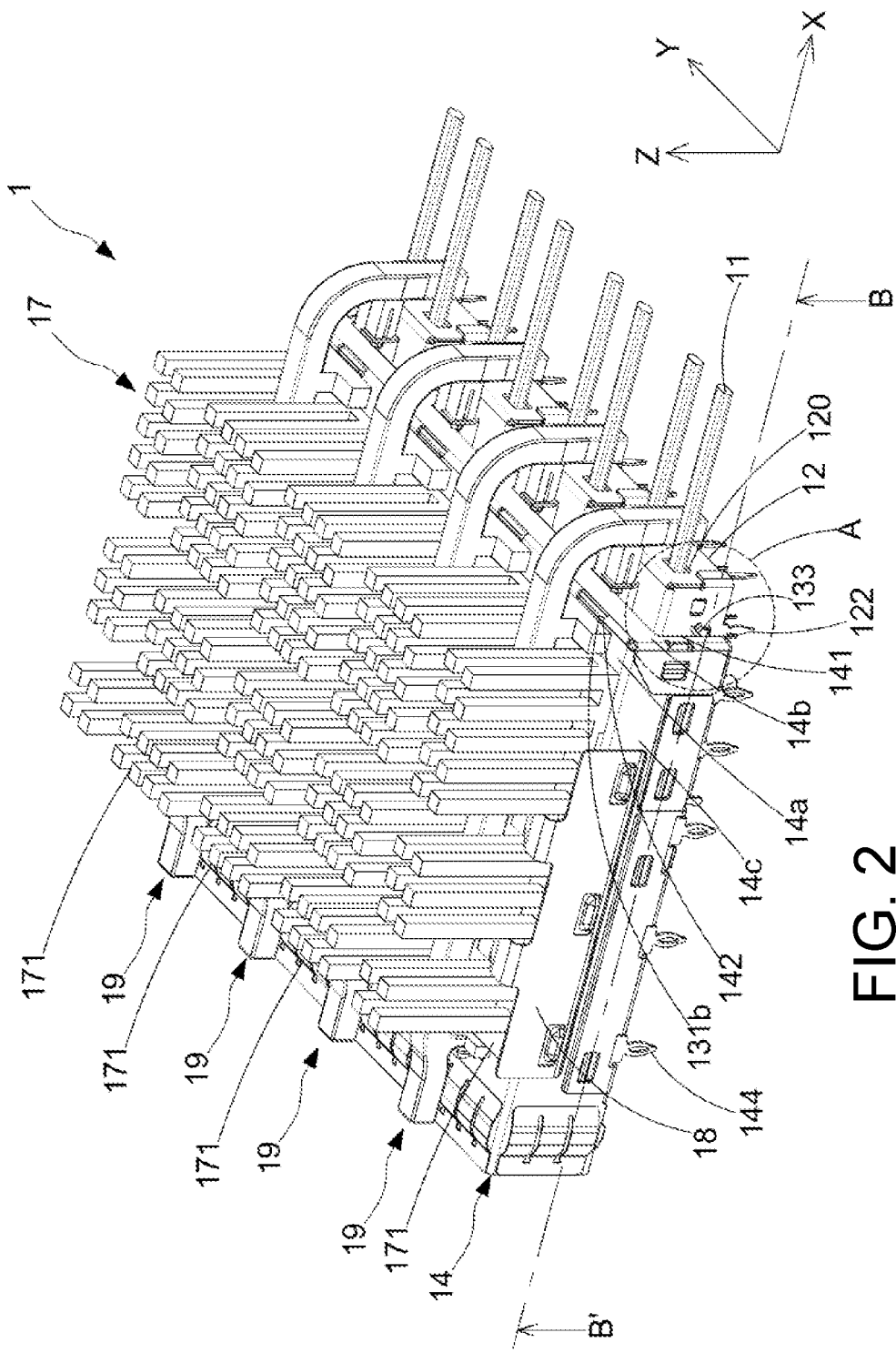
FIG. 2 is another perspective view of the electrical connector of the first embodiment of the present disclosure.
Figure 3:
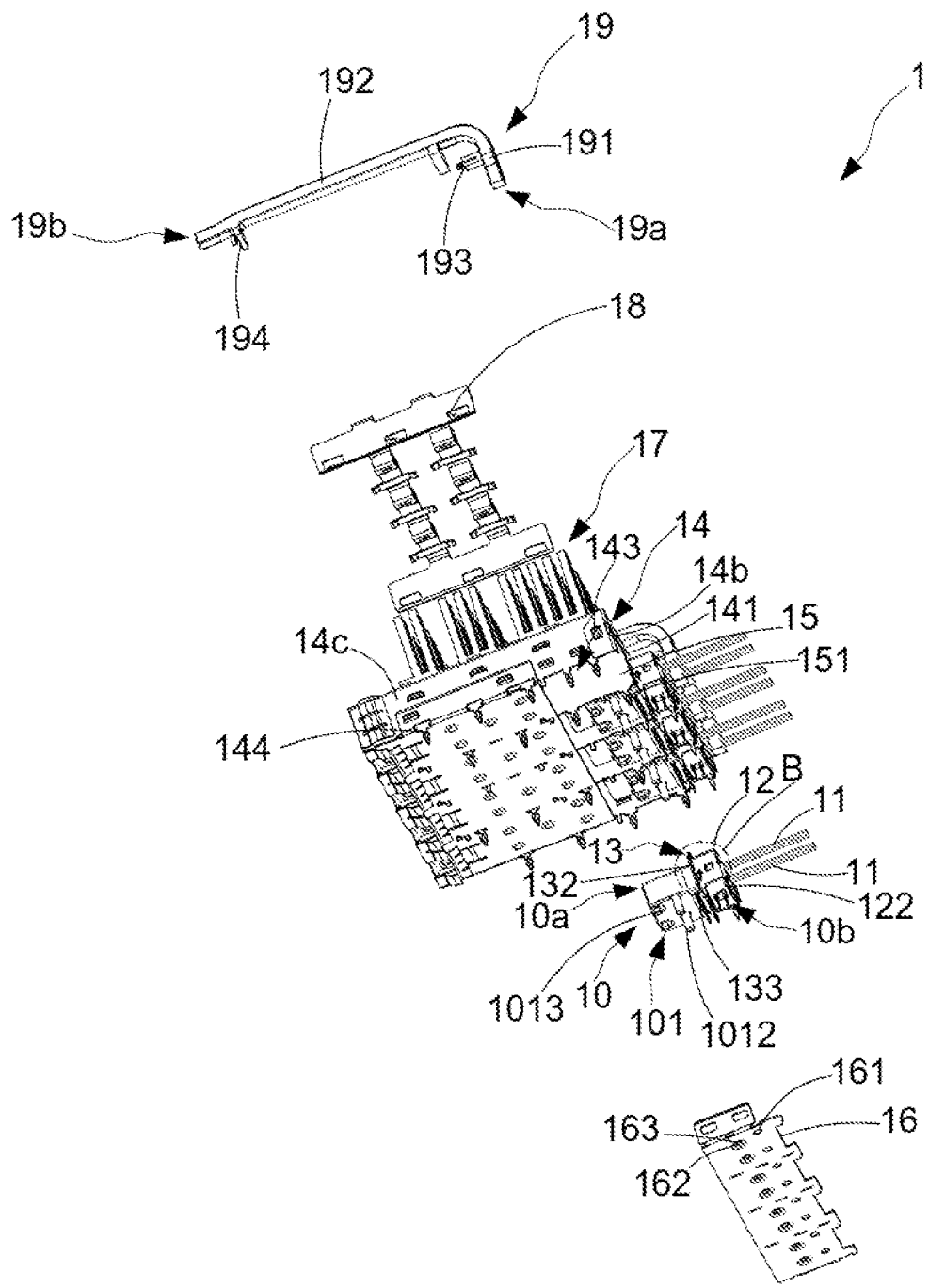
FIG. 3 is a partially exploded view of the electrical connector of the first embodiment of the present disclosure.
Figure 4:
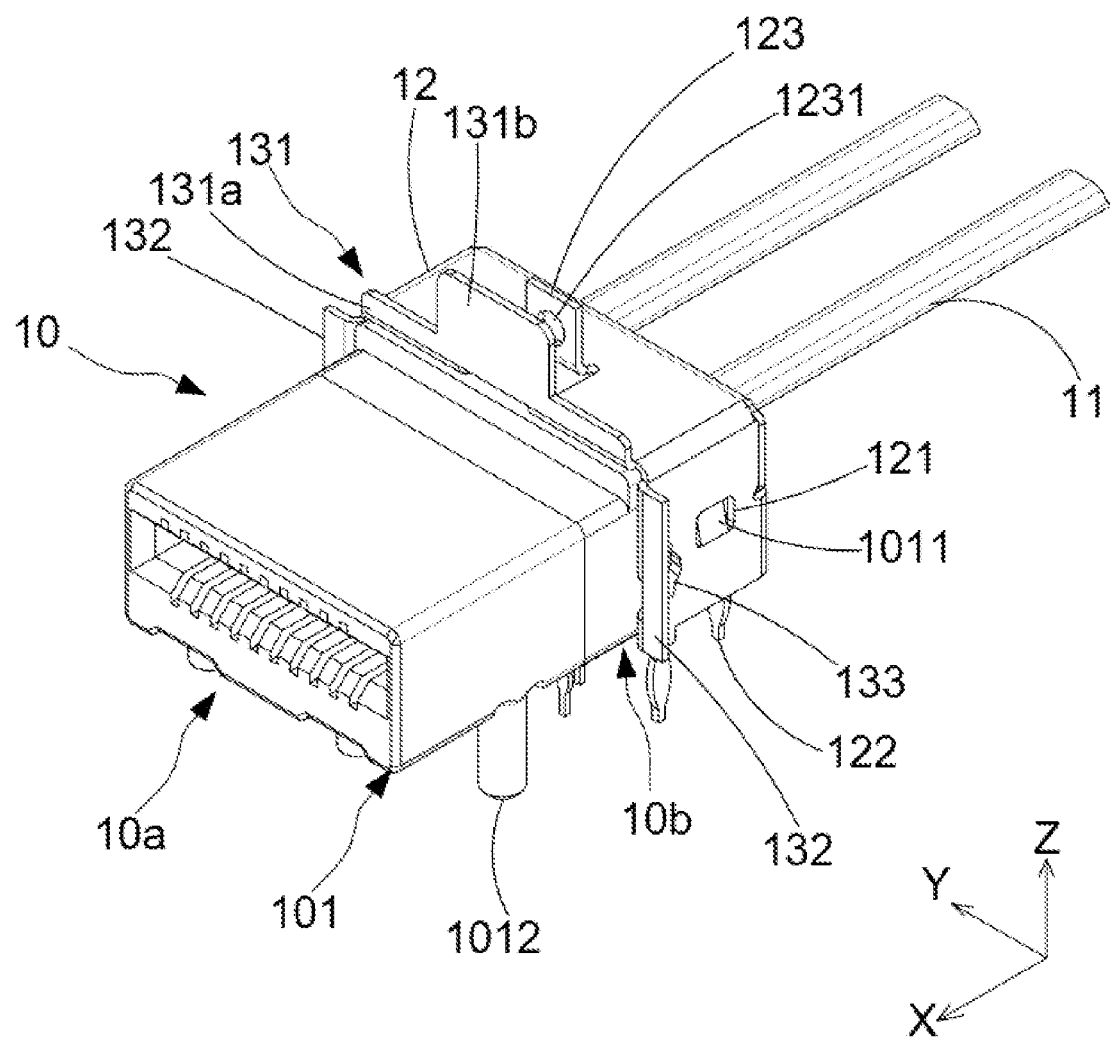
FIG. 4 is a perspective view of the assembly of a connector main body, a cable, and a connecting housing of the first embodiment of the present disclosure.
Figure 5:
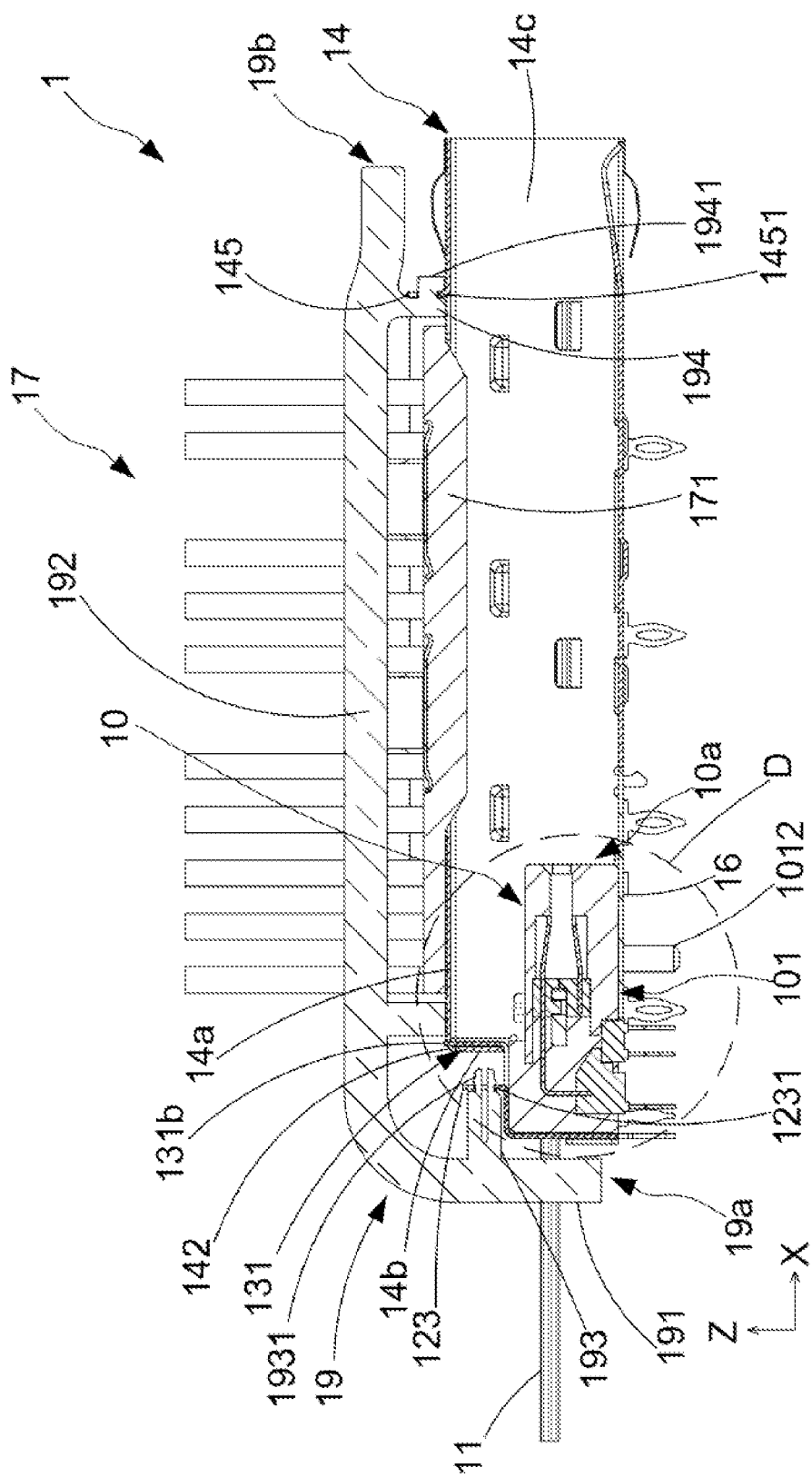
FIG. 5 is a cross-sectional view along line A-A' of FIG. 1.
Figure 6:
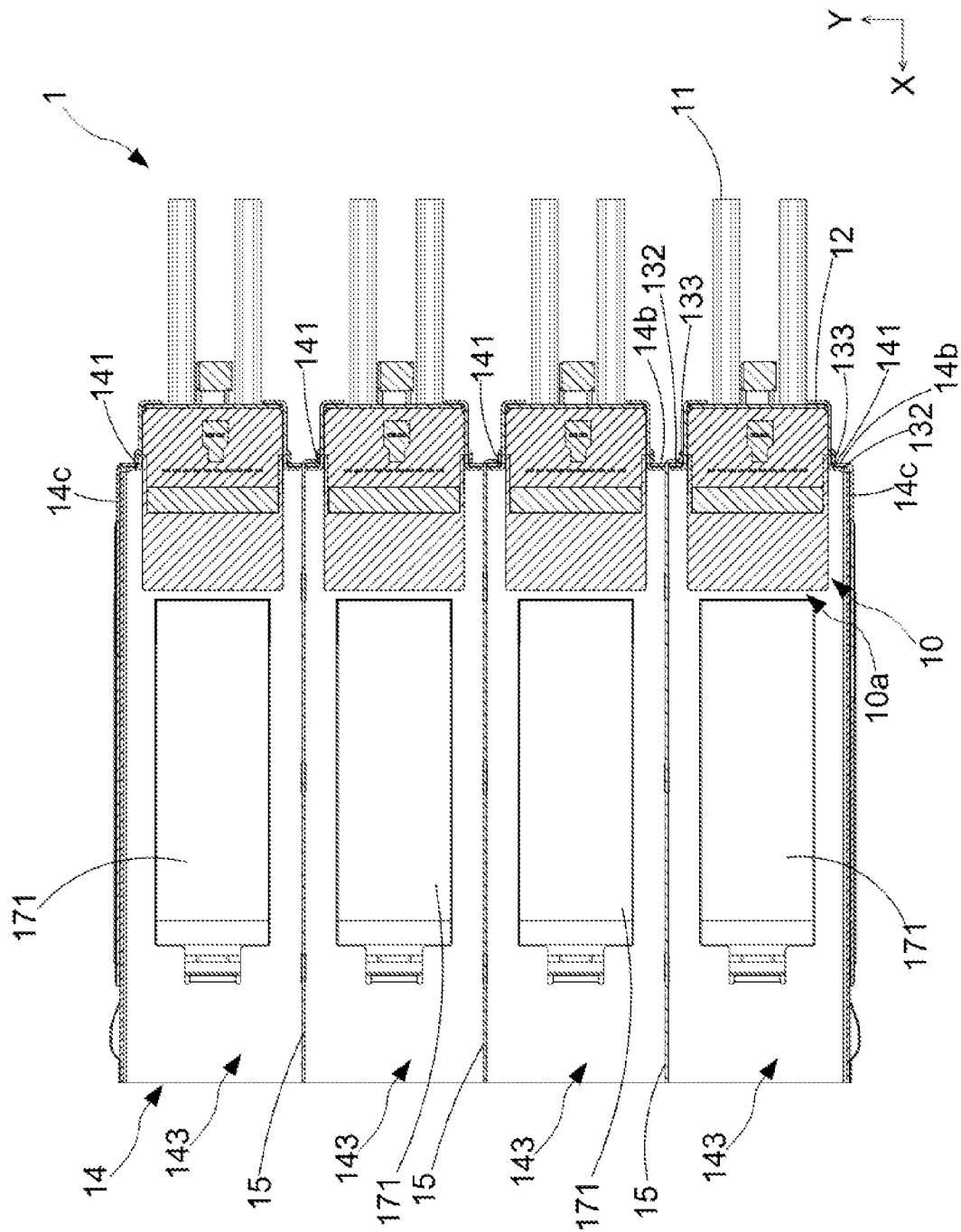
FIG. 6 is a cross-sectional view along line B-B' of FIG. 2.

FIG. 1 to FIG. 3 are perspective views and partially exploded view of an electrical connector of the first embodiment of the present disclosure. FIG. 4 is a perspective view of the assembly of a connector main body, a cable, and a connecting housing of the first embodiment of the present disclosure. FIG. 5 is a cross-sectional view along line A-A' of FIG. 1. FIG. 6 is a cross-sectional view along line B-B' of FIG. 2. As shown in the figures, the electrical connector 1 of this embodiment is an I/O connector, which is connected to a chip connector through a cable to perform high-speed transmission. In this embodiment, the electrical connector 1 comprises a connector main body 10, a cable 11, a connecting housing 12, a limiting member 13, and a housing 14. The connector main body 10 comprises a plugging side 10a and connecting side 10b oppositely disposed. The connector main body 10 comprises a plurality of terminals. One end of the cable 11 is connected to at least one of the plurality of terminals and protrudes from the connecting side 10b of the connector main body 10. The cable 11 passes through one side of the connecting housing 12 close to the connecting side 10b, i.e., a surface of the connecting housing 12 close to the connecting side 10b comprises a wiring hole 120. The cable 11 passes through the wiring hole 120 to protrude from one side of the connecting housing 12 close to the connecting side 10b. The limiting member 13 is disposed at one side of the connecting housing 12 close to the plugging side 10a, and the housing 14 is disposed at one side of the connecting housing 12 close to the plugging side 10a. The connecting housing 12 is disposed on a sidewall of the housing 14 in a first direction X and protrudes from the sidewall of the housing 14 in the first direction X in a direction away from the housing 14. The plugging side 10a of the connector main body 10 is disposed in the housing 14. The limiting member 13 corresponds to the sidewall of the housing 14 in the first direction X to prevent the connecting housing 12 from detaching from the housing 14 in the first direction X. Specifically, the housing 14 comprises a first sidewall 14a, a second sidewall 14b and two third sidewalls 14c. The second sidewall 14b is disposed on a side edge of the first sidewall 14a in the first direction X, and the two third sidewalls 14c are respectively disposed on two side edges of the first sidewall 14a in a second direction Y The second sidewall 14b and the two third sidewalls 14c extend along a third direction Z. The second sidewall 14b is connected with the two third sidewalls 14c, the second sidewall 14b is disposed between the two third sidewalls 14c, and the second sidewall 14b is a sidewall of the housing 14 in the first direction X. That is, the connecting housing 12 is disposed on the second sidewall 14b and protrudes from the second sidewall 14b in a direction away from the housing 14. The second sidewall 14b comprises an assembly notch 141 extending from one side of the second sidewall 14b away from the first sidewall 14a to one side of the second sidewall 14b connected to the first sidewall 14a. The connecting housing 12 is disposed in the assembly notch 141, and the limiting member 13 corresponds to the second sidewall 14b to limit the displacement of the connecting housing 12 in the first direction X.

The limiting member 13 is disposed at one side of the connecting housing 12 close to the assembly notch 141 to correspond to the second sidewall 14b of the housing 14. Specifically, for description in the follows, the limiting member 13 comprises a first limiting piece 131, two second limiting pieces 132, and a limiting bump 133. The first limiting piece 131 is disposed at one side of the connecting housing 12 close to a surface of the first sidewall 14a and extends in a direction toward the first sidewall 14a along the third direction Z. In this embodiment, the first limiting piece 131 is disposed at one side of the connecting housing 12 close to a surface of the first sidewall 14a. The two second limiting pieces 132 are respectively disposed at one side of the connecting housing 12 close to a surface of the corresponding third sidewall 14c and extend in a direction toward the corresponding third sidewall 14c along the second direction Y. In this embodiment, the two second limiting pieces 132 are respectively disposed on a side edge of the connecting housing 12 close to a surface of the corresponding third sidewall 14c. The two limiting bumps 133 are respectively disposed at one side of the connecting housing 12 close to a surface of the corresponding third sidewall 14c, and protrude in a direction toward the corresponding third sidewall 14c along the second direction Y. Each of the limiting bumps 133 is opposite to the corresponding second limiting piece 132. When the connecting housing 12 is disposed in the assembly notch 141, the first limiting piece 131 and the two second limiting pieces 132 would be disposed in the housing 14, and the first limiting piece 131 and the two second limiting pieces 132 would respectively correspond to an inner surface of the second sidewall 14b. In this way, the connecting housing 12 can be restricted from moving along the first direction X toward an outer surface of the second sidewall 14b of the housing 14. The two limiting bumps 133 are disposed at the outside of the housing 14 and respectively correspond to the outer surface of the second sidewall 14b so that the connecting housing 12 can be restricted from moving along the first direction X toward the inner surface of the second sidewall 14b of the housing 14.

Figure 7:
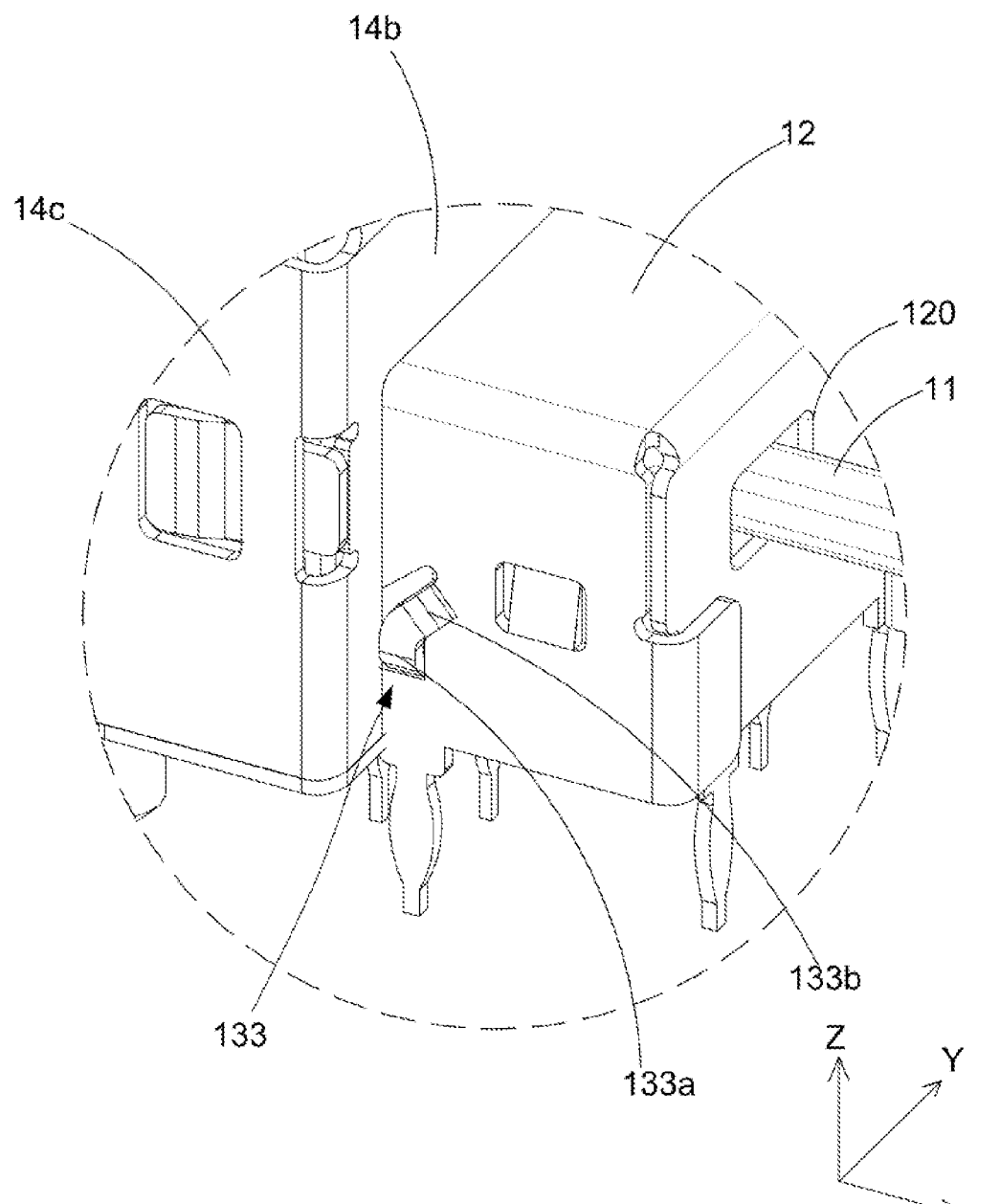
FIG. 7 is an enlarged view of area A of FIG. 2.
Figure 8:
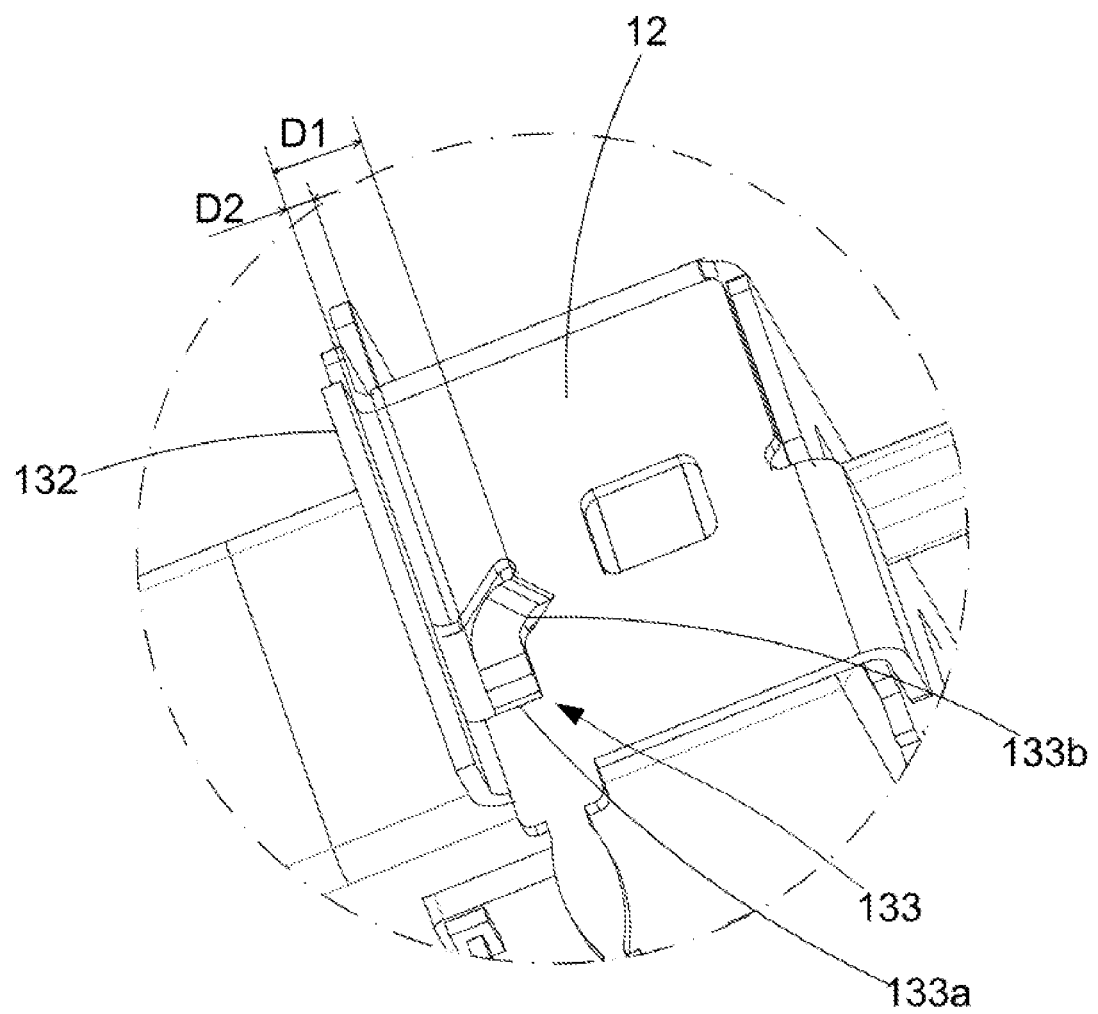
FIG. 8 is an enlarged view of area B of FIG. 3.

FIG. 7 is an enlarged view of area A of FIG. 2. FIG. 8 is an enlarged view of area B of FIG. 3. As shown in the figures, the limiting bump 133 of this embodiment comprises a limiting end part 133a and a guiding end part 133b. The limiting end part 133a is parallel to a side edge of a surface of the connecting housing 12 close to the corresponding third sidewall 14c, that is, parallel to the third direction Z. The guiding end part 133b is inclined to a side edge of a surface of the connecting housing 12 close to the corresponding third sidewall 14c, that is, inclined to the third direction Z. The minimum distance D1 between one end of the guiding end part 133b away from the limiting end part 133a and the corresponding second limiting piece 132 is greater than the minimum distance D2 between one end of the guiding end part 133b close to the limiting end part 133a and the corresponding second limiting piece 132. When the connecting housing 12 is disposed in the assembly notch 141, the second sidewall 14b of the housing 14 would first pass through the guiding end part 133b followed by entering the limiting end part 133a. Since the guiding end part 133b could guide the second sidewall 14b of the housing 14 to enter the space between the second limiting piece 132 and the limiting end part 133a, the guiding end part 133b is closer than the limiting end part 133a to the first sidewall 14a. Meanwhile, the minimum distance D2 between the limiting end part 133a and the corresponding second limiting piece 132 is slightly greater than or equal to the thickness of the second sidewall 14b (see FIG. 6) to limit the connecting housing 12 to the housing 14. In this embodiment, the limiting member 13 and the connecting housing 12 are integrally formed, the first limiting piece 131 and the two second limiting pieces 132 are manufactured by stamping and bending, and the two limiting bumps 133 are formed by stamping. The limiting bump 133 of this embodiment is hollowed.

Referring to FIG. 2, FIG. 4, and FIG. 5, in this embodiment, the first limiting piece 131 comprises a limiting part 131a and a positioning part 131b. The limiting part 131a is closer than the positioning part 131b to the connecting housing 12. The first sidewall 14a of the housing 14 comprises a positioning hole 142. When the connecting housing 12 is disposed in the assembly notch 141, the positioning part 131b would be disposed in the positioning hole 142 to position the connecting housing 12 in the housing 14. The limiting part 131a corresponds to the inner surface of the second sidewall 14b to restrict the connecting housing 12 from moving along the first direction X toward the outer surface of the second sidewall 14b. The width of the positioning part 131b in the second direction Y is narrower than the width of the limiting part 131a in the second direction Y.

In other embodiments, a plurality of first limiting pieces 131 could be provided on a side edge of a connecting housing 12 close to a first sidewall 14a, and a plurality of second limiting pieces 132 can be provided on a side edge of the connecting housing 12 close to the corresponding third sidewall 14c, which perform the same limiting effect as the above embodiment do.

In other embodiments, the limiting member 13 could only comprise at least one of the first limiting piece 131, the second limiting piece 132, and limiting bump 133. For example, the limiting member 13 comprises a first limiting piece 131, two second limiting pieces 132, or two limiting bumps 133, or the limiting member 13 comprises a first limiting piece 131 and two second limiting pieces 132, two second limiting pieces 132 and two limiting bumps 133, or a first limiting piece 131 and two limiting bumps 133.

Referring to FIG. 4, the connector main body 10 further comprises an insulating body 101 in which a plurality of terminals are disposed. In one embodiment, two sides of the insulating body 101 on the second direction Y are further provided with a first positioning part 1011. The two opposite sides of the connecting housing 12 are further provided with a second positioning part 121, respectively. When the connecting housing 12 is disposed on the connector main body 10, each of the second positioning parts 121 would be connected with the corresponding first positioning part 1011 to secure the connecting housing 12 onto the connector main body 10. In this embodiment, the first positioning part 1011 is a column, and the second positioning part 121 is a hole.

In this embodiment, back to FIG. 1, FIG. 3 and FIG. 6, the electrical connector 1 further comprises a plurality of partitioning plates 15 disposed in the housing 14 at intervals. Specifically, the plurality of partitioning plates 15 are disposed on the inner surface of the first sidewall 14a of the housing 14 at intervals. One end of each of the partitioning plates 15 is connected with the second sidewall 14b of the housing 14. The plurality of partitioning plates 15 divide the space in the housing 14 into a plurality of accommodating space 143. In this embodiment, the number of the assembly notches 141 is multiple. The plurality of assembly notches 141 respectively correspond to the plurality of accommodating space 143. The number of the connector main bodies 10, the number of the cables 11, and the number of the connecting housings 12 are multiple. Each of the cables 11 is connected to the corresponding connector main body 10 respectively. Each of the connecting housings 12 is respectively disposed at one side of the corresponding connector main body 10. Each of the connecting housings 12 is disposed in the corresponding assembly notch 141. The plugging side 10a of each of the connector main bodies 10 is disposed in the corresponding accommodating space 143.

Referring to FIG. 3 to FIG. 5, in this embodiment, the electrical connector 1 further comprises a bottom plate 16. The bottom plate 16 is disposed at one side of the connector main body 10 away from the housing 14 and is connected with the housing 14. Specifically, the bottom plate 16 is disposed at one side of the insulating body 101 away from the housing 14. In one embodiment, a surface of the insulating body 101 away from the housing 14 is provided with a plurality of positioning posts 1012, and the bottom plate 16 comprises a plurality of positioning holes 161. When the bottom plate 16 is disposed at one side of the insulating body 101 away from the housing 14, each of the positioning posts 1012 would pass through the corresponding positioning hole 161 to position the bottom plate 16 on the connector main body 10. In an embodiment, the surface of the insulating body 101 away from the housing 14 is provided with a plurality of securing posts 1013. The bottom plate 16 comprises a plurality of inner grooves 162 and a plurality of securing holes 163, wherein the inner groove 162 is recessed inward in a direction toward the first sidewall 14a, and the securing hole 163 is disposed in the inner groove 162. When the securing post 1013 passes through the corresponding securing hole 163, one end of the securing post 1013 at the outside of the bottom plate 16 is heated to melt. The molten securing post 1013 covers the inner groove 162 which is around the securing hole 163 so that the bottom plate 16 can be secured to the connector main body 10.

Referring to FIG. 2 to FIG. 4, a plurality of inserting members 122 are disposed at one side of the connecting housing 12 away from the first sidewall 14a of the housing 14 at intervals. A plurality of inserting members 144 are disposed at one side of the second sidewall 14b and the third sidewall 14c of the housing 14 away from the first sidewall 14a at intervals. A plurality of inserting members 151 are provided at one side of each of the partitioning plates 15 away from the first sidewall 14a of the housing 14 at intervals. The plurality of inserting members 151 of each of the partitioning plates 15 pass through the bottom plate 16. When the electrical connector 1 is connected to an external circuit board, the plurality of inserting members 122 of the connecting housing 12, the plurality of inserting members 144 of the housing 14, and the plurality of inserting members 151 of each of the partitioning plates 15 are directly inserted on the circuit board. The plurality of inserting members 122 of the connecting housing 12, the plurality of inserting members 144 of the housing 14, and the plurality of inserting members 151 of each of the partitioning plates 15 could respectively comprise a fisheye component to allow the electrical connector 1 to be stably connected with the circuit board.

Referring to FIG. 2, FIG. 3, and FIG. 6, in this embodiment, the electrical connector 1 further comprises a heat dissipating component 17, which is disposed on an outer surface of the first sidewall 14a of the housing 14. The heat dissipating component 17 comprises a plurality of heat sinks 171. The plurality of heat sinks 171 are disposed on the outer surface of the first sidewall 14a of the housing 14 at intervals along the second direction Y, and respectively correspond to the plurality of accommodating space 143 to dissipate the heat from the mating connector inserted in the corresponding accommodating space 143. Each of the heat sinks 171 could be a finned heat sink or a cylindrical heat sink. The heat sink 171 of this embodiment is cylindrical. In this embodiment, the connector 1 further comprises a securing elastic piece 18, which is disposed at one side of the heat dissipating component 17 and is connected to the housing 14. The securing elastic piece 18 abuts against the plurality of heat sinks 171 to secure the plurality of heat sinks 171 on the housing 14.

Referring to FIG. 2, FIG. 4, and FIG. 5, in this embodiment, the electrical connector 1 further comprises a light guiding tube 19, comprising a light entering end 19a and a light exiting end 19b. The light entering end 19a of the light guiding tube 19 is disposed at one side of the connecting housing 12 away from the housing 14, and the light exiting end 19b of the light guiding tube 19 is disposed at one side of the housing 14. The light guiding tube 19 could guide the light emitted by light-emitting members of the circuit board. Specifically, the light guiding tube 19 comprises a first light guiding end part 191 and a second light guiding end part 192 that are mutually connected. The first light guiding end part 191 extends along the third direction Z, and the second light guiding end part 192 extends along the first direction X, forming a L-shaped light guiding tube 19. The light entering end 19a is disposed at one end of the first light guiding end part 191 away from the second light guiding end part 192, and the light exiting end 19b is disposed at one end of the second light guiding end part 192 away from the first light guiding end part 191. The first light guiding end part 191 is disposed at one side of the connecting housing 12 away from the housing 14, and the second light guiding end part 192 is disposed at one side of the first sidewall 14a of the housing 14. The light pipe 19 further comprises a first positioning column 193 and a second positioning column 194. The first positioning column 193 is disposed at the first light guiding end part 191 and extends toward the light exiting end 19b along the first direction X. The second positioning column 194 is disposed at the second light guiding end part 192 and extends toward the light entering end 19a along the third direction Z. An outer surface of the connecting housing 12 in the third direction Z further comprises a first positioning tab 123, which extends along the third direction Z. The outer surface of the first sidewall 14a of the housing 14 further comprises a second positioning tab 145, which extends along the third direction Z. When the connecting housing 12 is disposed on the housing 14, the first positioning tab 123 would be disposed at the outside of the housing 14. A gap would exist between the first positioning tab 123 the second sidewall 14b of the housing 14. When the light guiding tube 19 is disposed on the housing 14, the first positioning column 193 would be connected with the first positioning tab 123, and the second positioning column 194 would be connected with the second positioning tab 145 to secure the light guiding tube 19 on the connecting housing 12 and the housing 14. In this embodiment, one end of the first positioning column 193 away from the first light guiding end part 191 is provided with a first buckling part 1931, and the first positioning tab 123 comprises a first positioning through hole 1231. When the first buckling part 1931 passes through the first positioning through hole 1231, the first buckling part 1931 would abut against a surface of the first positioning through hole 1231 close to the second sidewall 14b to secure the light guiding tube 19 on the connecting housing 12. Similarly, one end of the second positioning column 194 away from the second light guiding end part 192 is provided with a second buckling part 1941, and the second positioning tab 145 comprises a second positioning through hole 1451. When the second buckling part 1941 passes through the second positioning through hole 1451, the second buckling part 1941 would abut against a surface of the second positioning through hole 1451 away from the second sidewall 14b to secure the light guiding tube 19 on the housing 14. In this embodiment, the number of light guiding tubes 19 is multiple. The plurality of light guiding tubes 19 are disposed on the housing 14 at intervals and respectively correspond to the plurality of connecting housings 12.

Figure 9:
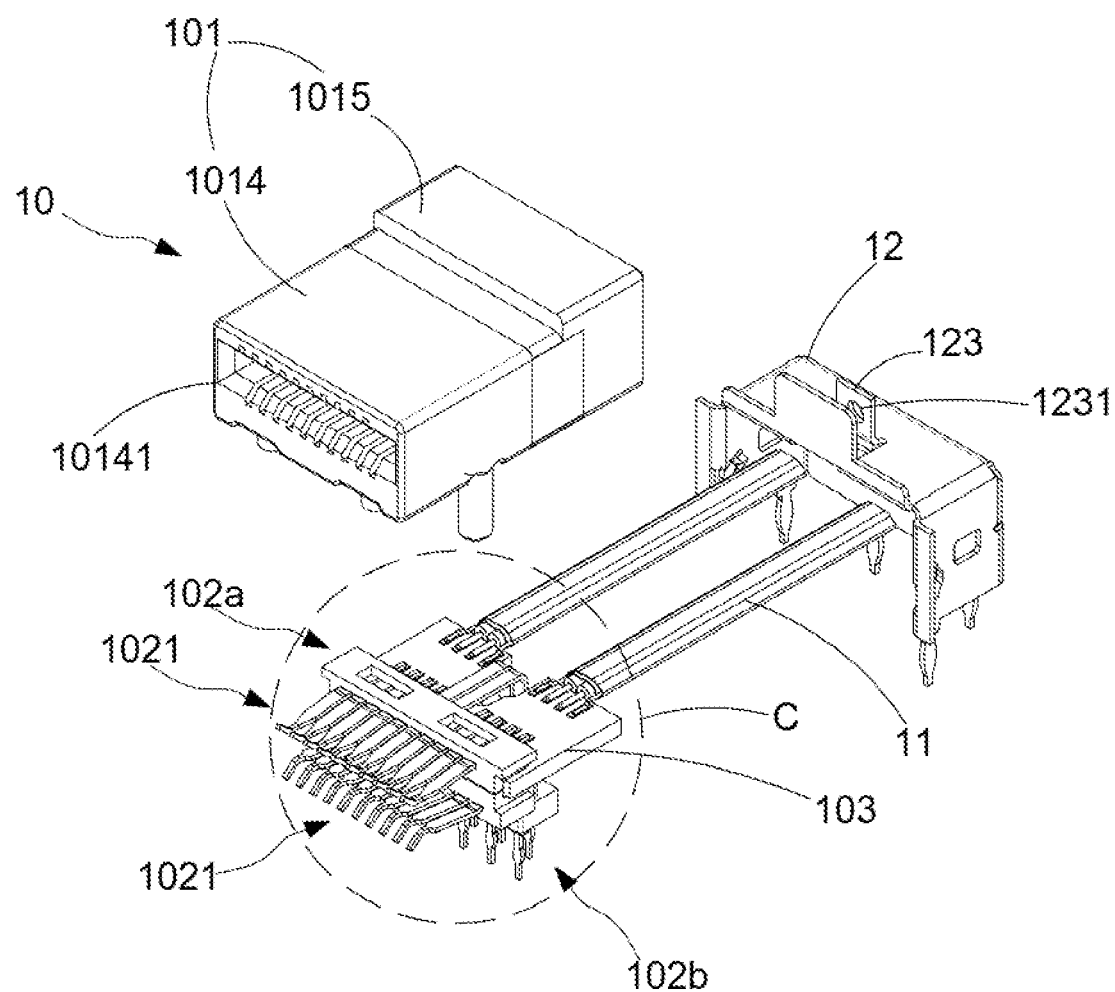
FIG. 9 is an exploded view of FIG. 4.
Figure 10:
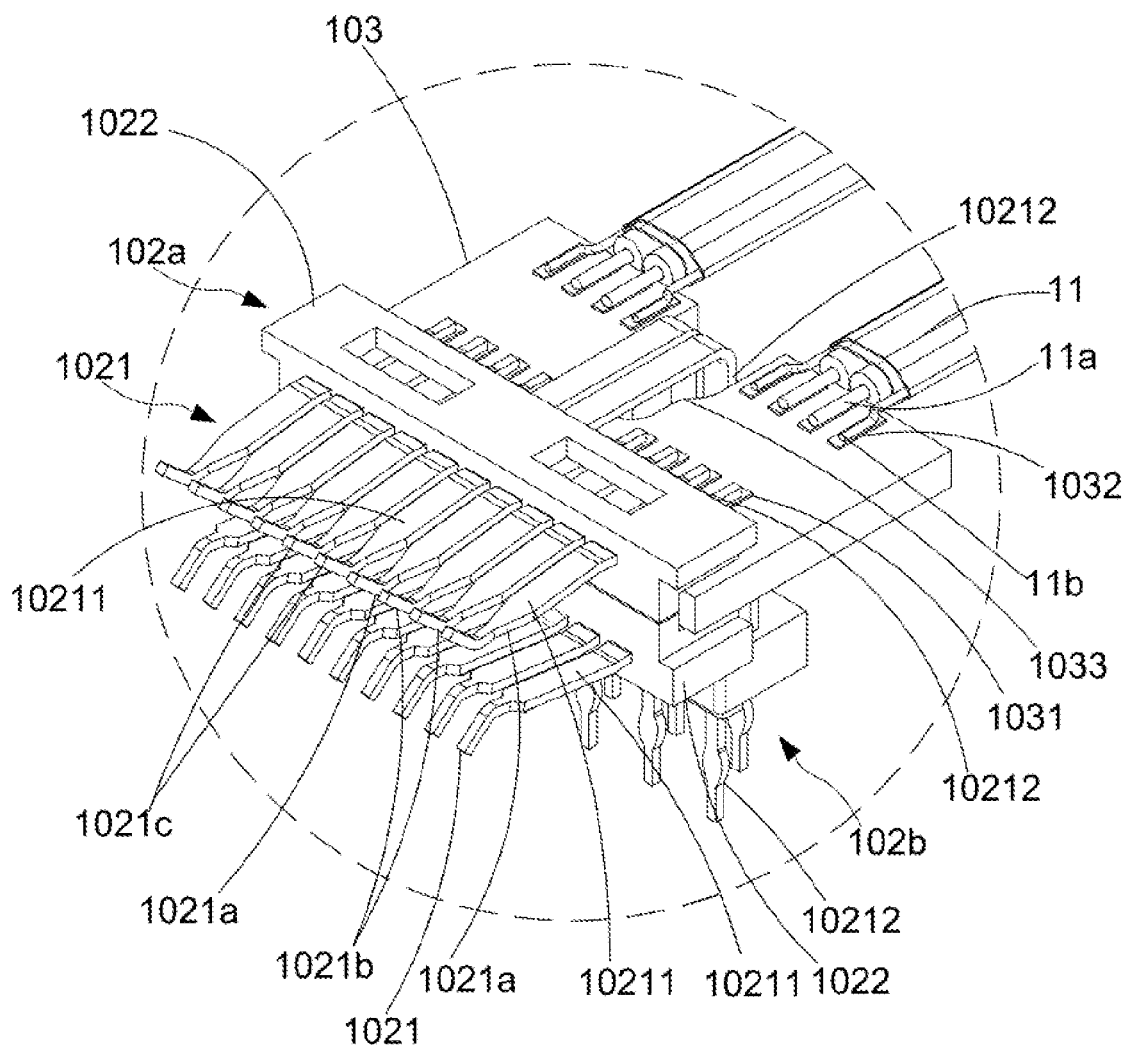
FIG. 10 is an enlarged view of area C of FIG. 9.

The following would be describing the configuration of the connector main body 10 of this embodiment s in detail. FIG. 9 is an exploded view of FIG. 4. FIG. 10 is an enlarged view of area C of FIG. 9. As shown in the figures, the connector main body 10 comprises a first terminal component 102a and a second terminal component 102b, and the first terminal component 102a is disposed at one side of the second terminal component 102b. The first terminal component 102a and the second terminal component 102b respectively comprise a plurality of terminals 1021. The connector main body 10 of this embodiment further comprises an adapting board 103, which is disposed between the first terminal component 102a and the second terminal component 102b. A plurality of terminal conductive pads 1031 and a plurality of cable conductive pads 1032 are disposed on a surface of the adapting board 103 close to the first terminal component 102a. The plurality of terminal conductive pads 1031 are disposed in a row at intervals and are disposed at one side of the adapting board 103, and the plurality of cable conductive pads 1032 are disposed in a row at intervals and are disposed on the other side of the adapting board 103. Each of the terminal conductive pads 1031 is connected with the corresponding terminal 1021 of the first terminal component 102a. The number of cables 11 is multiple, and each of the cables 11 comprises at least one signal wire 11a and at least one ground wire 11b. Each of the signal wires 11a of each of the cables 11 is connected with the corresponding cable conductive pad 1032, and each of the ground wires 11b of each of the cables 11 is connected with the corresponding cable conductive pad 1032. The insulating body 101 is disposed on the first terminal component 102a, the second terminal component 102b, the adapting board 103, and the plurality of cables 11 to cover a part of the first terminal component 102a, a part of the second terminal component 102b, the adapting board 103 and a part of the cables 11.

Figure 11:
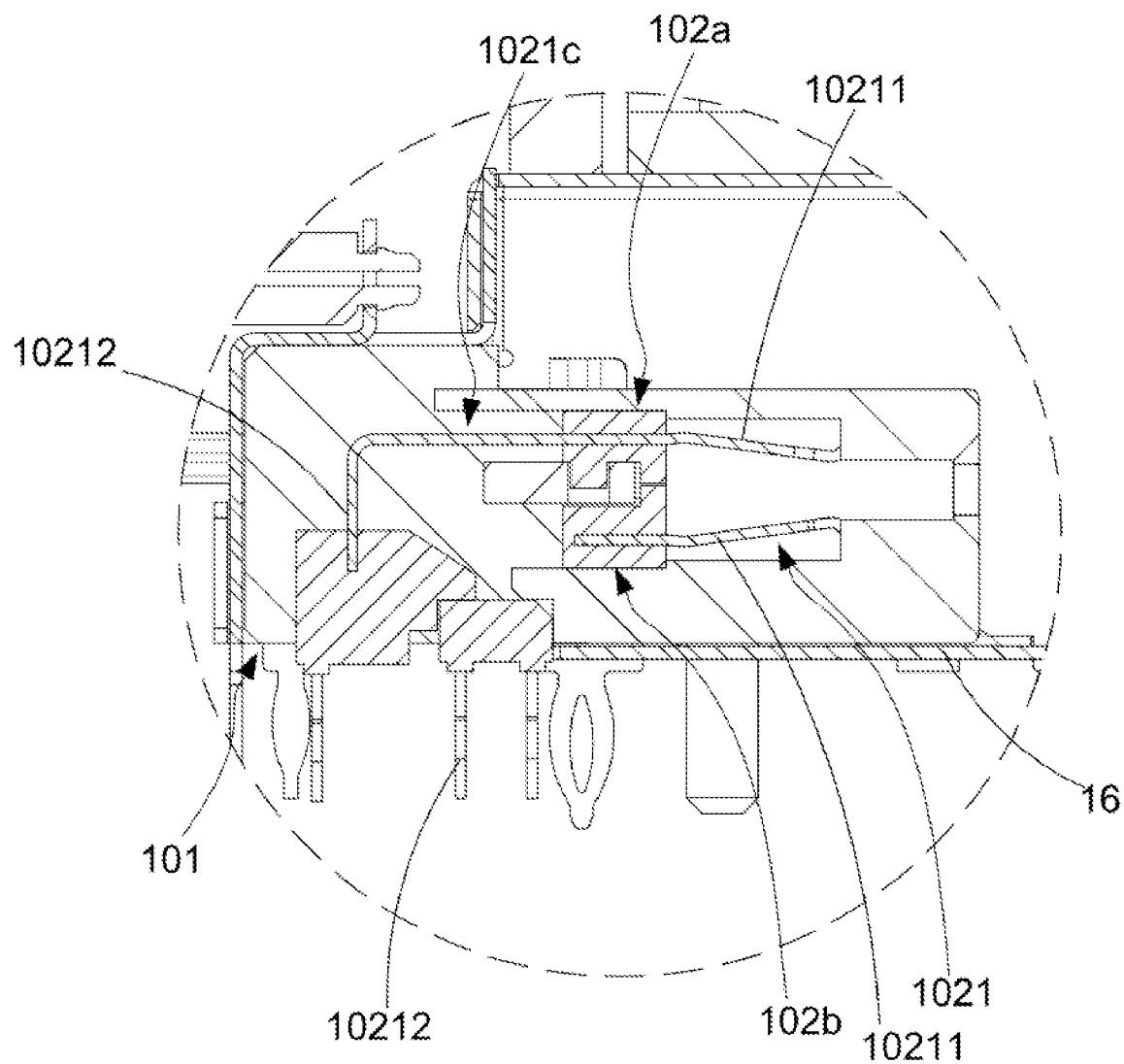
FIG. 11 is an enlarged view of area D of FIG. 5.

In this embodiment, the plurality of terminals 1021 of the first terminal component 102a comprises a plurality of ground terminals 1021a, a plurality of signal terminals 1021b, and a plurality of power terminals 1021c. The number of the ground terminals 1021a is four, the number of the signal terminals 1021b is four, and the number of the power terminals 1021c is two. Two signal terminals 1021b are disposed between two adjacent ground terminals 1021a and the two power terminals 1021c are adjacently disposed. The two adjacent power terminals 1021c are a power terminal group, and two sides of the power terminal group are respectively provided with a ground terminal 1021a, i.e., two adjacent power terminals 1021c (power terminal group) are disposed between two adjacent ground terminals 1021a. Referring to FIG. 10, the plurality of terminals 1021 of the first terminal component 102a are arranged in an order of: ground terminal 1021a, two signal terminals 1021b, ground terminal 1021a, two power terminals 1021c, ground terminal 1021a, two signal terminals 1021b, and ground terminal 1021a, from the right to the left. The plurality of ground terminals 1021a and the plurality of signal terminals 1021b are respectively connected with the corresponding terminal conductive pads 1031. FIG. 11 is an enlarged view of area D of FIG. 5. As shown in the figure, the two power terminals 1021c and one ends of the plurality of terminals 1021 of the second terminal component 102b protrude from one side of the insulating body 101 to be connected with an external circuit board (not shown). In this embodiment, the plurality of signal terminals 1021b of the first terminal component 102a are high speed terminals, which are connected with the plurality of cables 11 through the adapting board 103, and are connected with an external chip connector through the plurality of cables 11 to perform high-speed transmission while ensuring the stability of the connection of the plurality of ground terminals 1021a and the plurality of signal terminals 1021b with the plurality of cables 11.

In this embodiment, each of the terminals 1021 comprises a contacting end part 10211 and a connecting end part 10212. The connecting end part 10212 of each of the ground terminals 1021a and the connecting end part 10212 of each of the signal terminals 1021b of the first terminal component 102a are respectively connected with the corresponding terminal conductive pad 1031. The width of the connecting end part 10212 of each of the ground terminals 1021a is narrower than the width of the contacting end part 10211 of each of the ground terminals 1021a and is narrower than the width of the terminal conductive pad 1031. In this way, it can be ensured that the connecting end part 10212 of each of the ground terminals 1021a can be disposed in the terminal conductive pad 1031 to increase the contacting area that the connecting end part 10212 of each of the ground terminals 1021a contacting with the terminal conductive pad 1031 for a stable connection between the connecting end part 10212 of each of the ground terminals 1021a and the corresponding terminal conductive pad 1031. Similarly, the width of the connecting end part 10212 of each of the signal terminals 1021b is narrower than the width of the contacting end part 10211 of each of the signal terminals 1021b and is narrower than the width of the terminal conductive pad 1031. In this way, it can be ensured that the connecting end part 10212 of each of the signal terminals 1021b can be disposed in the terminal conductive pad 1031 to increase the contacting area that the connecting end part 10212 of each of the signal terminals 1021b contacting with the terminal conductive pad 1031 for a stable connection between the connecting end part 10212 of each of the signal terminals 1021b and the corresponding terminal conductive pad 1031. The wire diameter of each of the signal wires 11a and the wire diameter of each of the ground wires 11b of each of the cables 11 are also smaller than or equal to the width of the cable conductive pad 1032 to ensure that each of the signal wires 11a and each of the ground wires 11b can be respectively disposed in the cable conductive pad 1032 to increase the contacting area that each of the signal wires 11a and each of the ground wires 11b contacting with the corresponding cable conductive pad 1032, allowing each of the signal wires 11a and each of the ground wires 11b to be stably connected with the corresponding cable conductive pad 1032, respectively. Besides, the plurality of signal wires 11a of each of the cables 11 are not directly soldered to the plurality of signal terminals 1021b, and the plurality of ground wires 11b of each of the cables 11 are not directly soldered to the plurality of ground terminals 1021. In this way, the wire diameter of each of the signal wires 11a and the wire diameter of each of the ground wires 11b of each of the cables 11 would not be limited by the dimensions of the terminal 1021. Thus, in addition to having more dimensions for the wire diameter of each of the signal wires 11a and the wire diameter of each of the ground wires 11b of each of the cables 11, the complexity of the soldering process and the overall soldering cost can be reduced.

The connecting end part 10212 of each of the power terminals 1021c of the first terminal component 102a is orthogonal to the contacting end part 10211. The adapting board 103 comprises a gap 1033. The connecting end part 10212 of each of the power terminals 1021c passes through the gap 1033 to protrude from one side of the insulating body 101. The extending direction of the connecting end part 10212 of each of the terminals 1021 of the second terminal component 102b is orthogonal to the extending direction of the contacting end part 10211. The connecting end part 10212 of each of the terminals 1021 protrudes from one side of the insulating body 101. In this embodiment, the connecting end part 10212 of each of the power terminals 1021c of the first terminal component 102a and the connecting end part 10212 of each of the terminals 1021 of the second terminal component 102b respectively comprises a fisheye component for being plugged onto an external circuit board. The connecting end part 10212 of each of the power terminals 1021c of the first terminal component 102a and the connecting end part 10212 of each of the terminals 1021 of the second terminal component 102b could also be directly soldered to an external circuit board.

In this embodiment, the first terminal component 102a and the second terminal component 102b further comprise a terminal insulating body 1022, respectively. The terminal insulating body 1022 of the first terminal component 102a is disposed on the plurality of terminals 1021 of the first terminal component 102a, and the terminal insulating body 1022 of the second terminal component 102b is disposed on the plurality of terminals 1021 of the second terminal component 102b. In this way, the plurality of terminals 1021 could be integrally formed into one piece through the terminal insulating body 1022 to the further assembling.

In this embodiment, the insulating body 101 comprises an insulating housing 1014 and an insulating covering body 1015. The insulating housing 1014 comprises a plugging slot 10141, in which the contacting end part 10211 of each of the terminals 1021 is disposed. The insulating covering body 1015 is connected with the insulating housing 1014 and covers the plurality of terminal insulating bodies 1022, the connecting end part 10212 of each of the terminals 1021, the adapting board 103, and a part of the cable 11. The connecting housing 12 is disposed on the insulating covering body 1015, and the bottom plate 16 is disposed on the insulating housing 1014.

Figure 12:
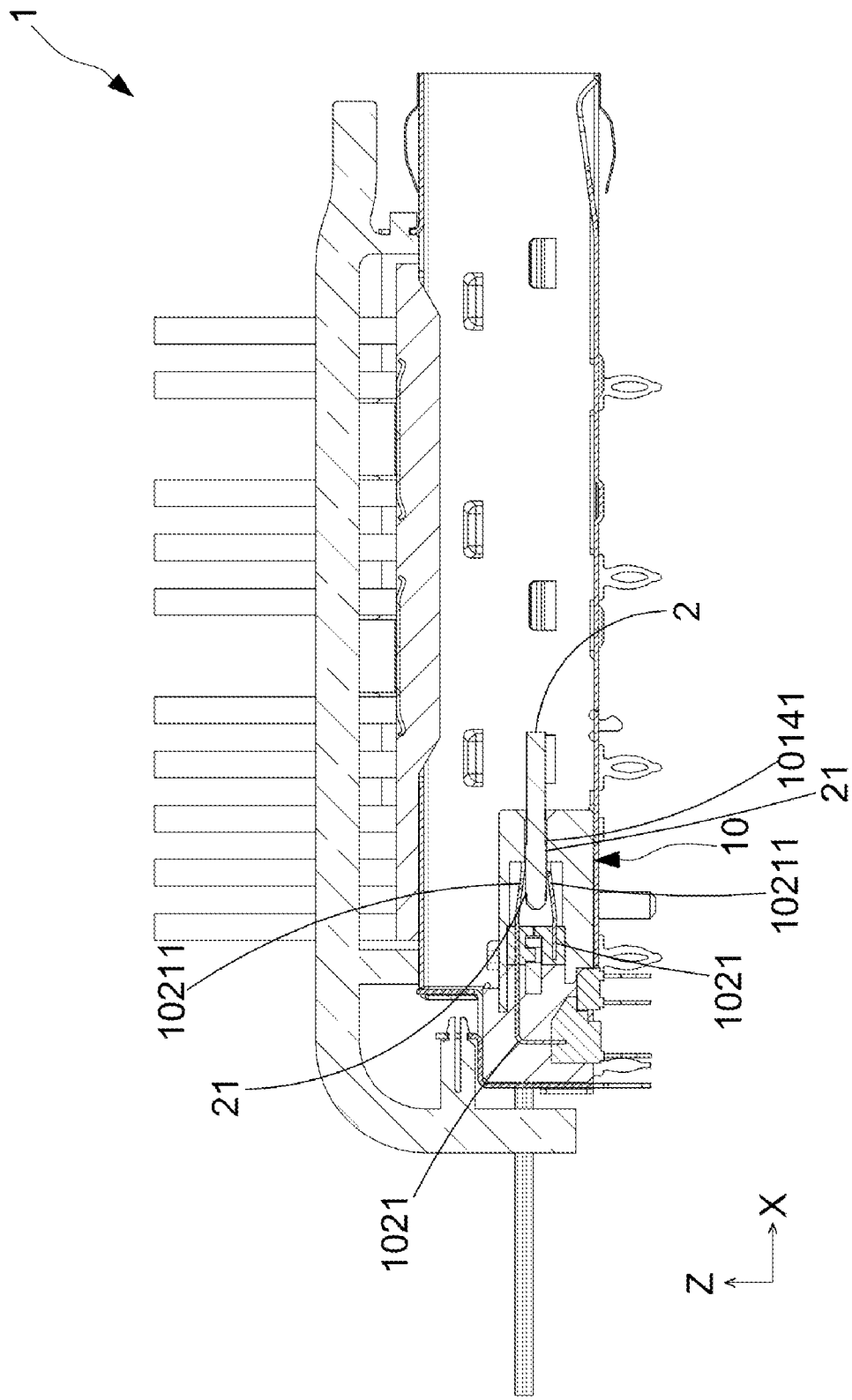
FIG. 12 is a use state diagram of the electrical connector of the first embodiment of the present disclosure.

FIG. 12 is a use state diagram of the electrical connector of the first embodiment of the present disclosure. As shown in the figure, when the electrical connector 1 of this embodiment is connected to a mating connector, the mating connector would comprise a plated member 2. Two opposite surfaces of the plated member 2 respectively comprise a plurality of contacting pads 21 disposed at intervals. The plated member 2 is inserted in the plugging slot 10141 of the connector main body 10, and the contacting end part 10211 of each of the terminals 1021 is connected with the corresponding contacting pad 21.

Figure 13:
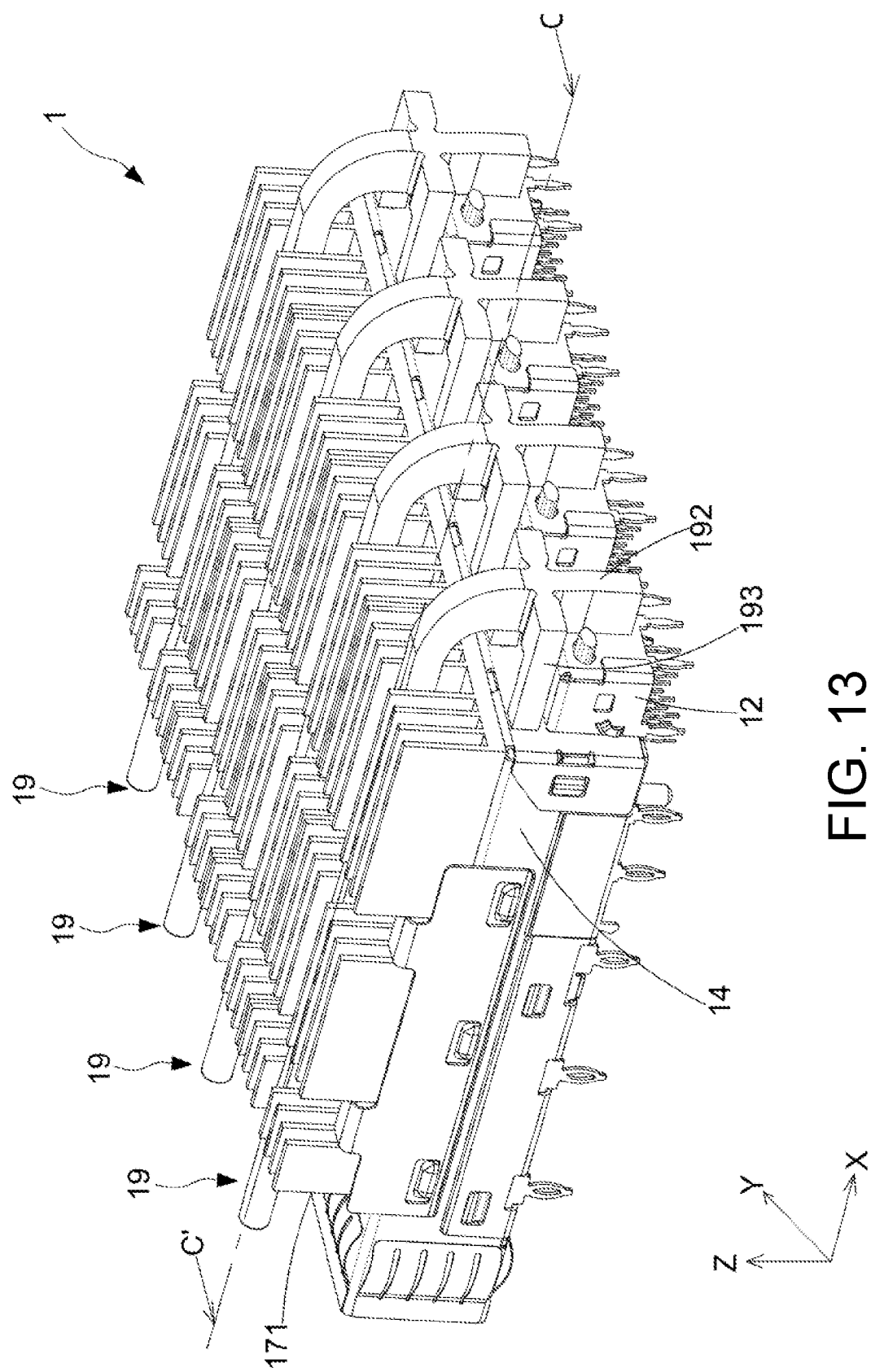
FIG. 13 is a perspective view of an electrical connector of the second embodiment of the present disclosure.
Figure 14:
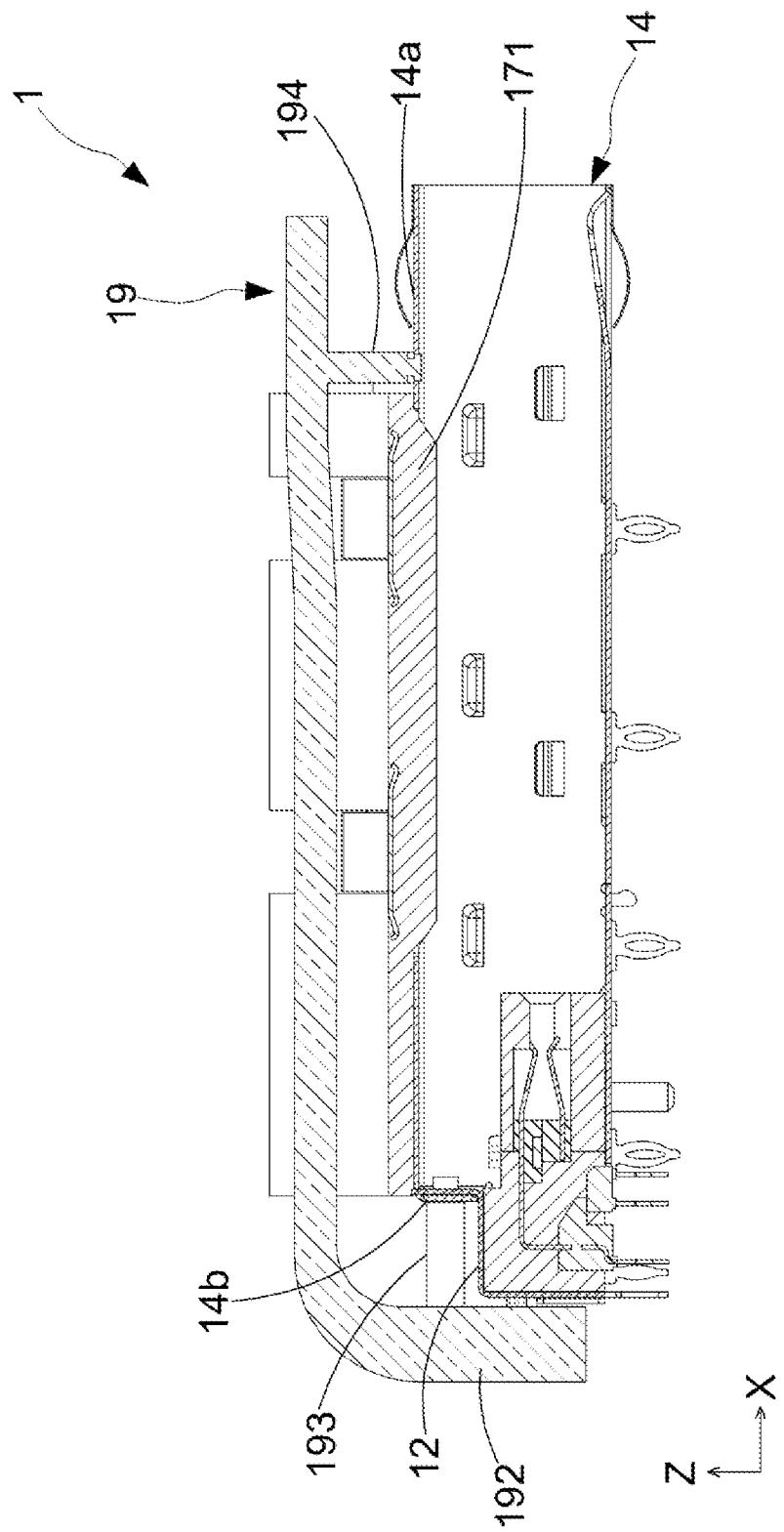
FIG. 14 is a cross-sectional view along line C-C' of FIG. 13.

FIG. 13 is a perspective view of an electrical connector of the second embodiment of the present disclosure. FIG. 14 is a cross-sectional view along line C-C' of FIG. 13. As shown in the figures, the electrical connector 1 of this embodiment is different from that of the first embodiment in that the first positioning tab is omitted in connecting housing 12 and the second positioning tab is omitted in the housing 14. The first positioning column 193 of each of the light guiding tubes 19 is directly connected with a sidewall (the second sidewall 14b) of the housing 14 in the first direction X, and the second positioning column 194 of each of the light guiding tubes 19 is directly connected with a sidewall (the first sidewall 14a) of the housing 14 in the third direction Z. The second light guiding end part 192 of each of the light guiding tubes 19 is close to a surface of the connecting housing 12 away from the housing 14 in the first direction X to limit the connecting housing 12 to be moving in the first direction X only. Besides, the heat sink 171 of this embodiment is a finned heat sink.

In summary, embodiments of the present disclosure provide an electrical connector. Since the plurality of terminals and the cable of the first terminal component are connected with the adapting board, selectable cables in multiple dimensions would be increased, the soldering process can be simplified, the soldering cost can be reduced, and the stability of the connection between the terminal and the cable would also be enhanced. The electrical connector of the present disclosure is an I/O connector, which is connected to an external chip connector through a cable. Thus, the transmission rate of the electrical connector can be increased.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. An electrical connector for high-frequency signal transmission, connected with a chip connector, comprising:
    a first terminal component comprising a plurality of terminals;
    an adapting board disposed at one side of the first terminal component, at least one of the plurality of terminals of the first terminal component being connected with the adapting board; and
    a cable, one end of the cable being connected with the adapting board, the other end of the cable being connected with the chip connector,
    wherein the plurality of terminals of the first terminal component comprises a plurality of ground terminals and a plurality of signal terminals; the plurality of ground terminals and the plurality of signal terminals respectively comprise a contacting end part and a connecting end part; the adapting board comprises a plurality of terminal conductive pads disposed at intervals; the connecting end part of any of the plurality of ground terminals and the connecting end part of any of the plurality of signal terminals are respectively connected with the corresponding terminal conductive pad, wherein the plurality of terminals of the first terminal component comprises a plurality of power terminals respectively comprising a contacting end part and a connecting end part; the adapting board comprises a gap; the connecting end part of any of the plurality of power terminals passes through the gap.

2. The electrical connector according to claim 1, wherein two signal terminals are disposed between two adjacent ground terminals.

3. The electrical connector according to claim 2, wherein the plurality of signal terminals are high speed terminals.

4. The electrical connector according to claim 1, wherein two adjacent power terminals of the plurality of power terminals form a power terminal group; two sides of the power terminal group are respectively provided with a ground terminal.

5. The electrical connector according to claim 1 comprising a circuit board, the connecting end part of any of the plurality of power terminals being connected with the circuit board.

6. The electrical connector according to claim 5, wherein the connecting end part of any of the plurality of power terminals comprises a fisheye component.

7. The electrical connector according to claim 5 comprising a second terminal component disposed at one side of the first terminal component, the adapting board being disposed between the first terminal component and the second terminal component, the second terminal component comprising a plurality of terminals respectively comprising a contacting end part and a connecting end part, the connecting end part of any of the plurality of terminals being connected with the circuit board.

8. The electrical connector according to claim 7, wherein any of the plurality of terminals of the second terminal component is a ground terminal, a signal terminal, or a power terminal.

9. The electrical connector according to claim 7, wherein the connecting end part of any of the plurality of terminals of the second terminal component comprises a fisheye component.

10. The electrical connector according to claim 7, wherein the first terminal component and the second terminal component respectively comprise a terminal insulating body; the terminal insulating body of the first terminal component is disposed on the plurality of terminals of the first terminal component; the terminal insulating body of the second terminal component is disposed on the plurality of terminals of the second terminal component.

11. The electrical connector according to claim 7 comprising an insulating body covering a part of the first terminal component, a part of the second terminal component, the adapting board, and a part of the cable.

12. The electrical connector according to claim 11, wherein the insulating body comprises a plugging slot configured to be plugged by a plated member of a mating connector; the plurality of terminals of the first terminal component and the plurality of terminals of the second terminal component are connected with the plated member.

13. The electrical connector according to claim 11 comprising a housing; the housing being disposed at one side of the insulating body and accommodating a part of the insulating body.

14. The electrical connector according to claim 13 comprising a connecting housing disposed at one side of the insulating body, the insulating body being disposed on the housing through the connecting housing, the connecting housing protruding from one side of the housing.

15. The electrical connector according to claim 1, wherein the cable comprises a signal wire and a ground wire; the adapting board comprises a plurality of cable conductive pads disposed at intervals; the signal wire and the ground wire are respectively connected with the corresponding cable conductive pad.

16. An electrical connector for high-frequency signal transmission, connected with a chip connector, comprising:
   a first terminal component comprising a plurality of terminals;
   a second terminal component comprising a plurality of terminals and being plugged onto an external circuit board,
   an adapting board disposed at one side of the first terminal component, at least one of the plurality of terminals of the first terminal component being connected with the adapting board; and
   a cable, one end of the cable being connected with the adapting board, the other end of the cable being connected with the chip connector,
   wherein the plurality of terminals of the first terminal component extended away from the adapting board in a first direction and the plurality of terminals of the second terminal component extended away from the adapting board in a second direction orthogonal to the first direction.

17. An electrical connector for high-frequency signal transmission, connected with a chip connector, comprising:
   a first terminal component comprising a plurality of terminals, at least one of the plurality of terminals comprising a contacting end part and a connecting end part orthogonal to the contacting end part;
   an adapting board disposed at one side of the first terminal component, the connecting end part of the at least one of the plurality of terminals of the first terminal component being connected with the adapting board; and
   a cable, one end of the cable being connected with the adapting board, the other end of the cable being connected with the chip connector.

* * * * *